Figure 1:
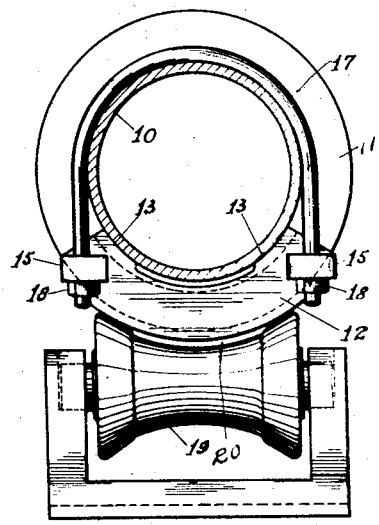
Figure 2:
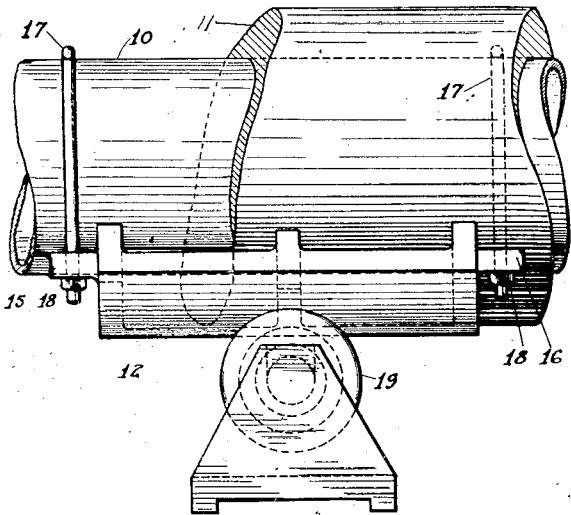
Figure 3:
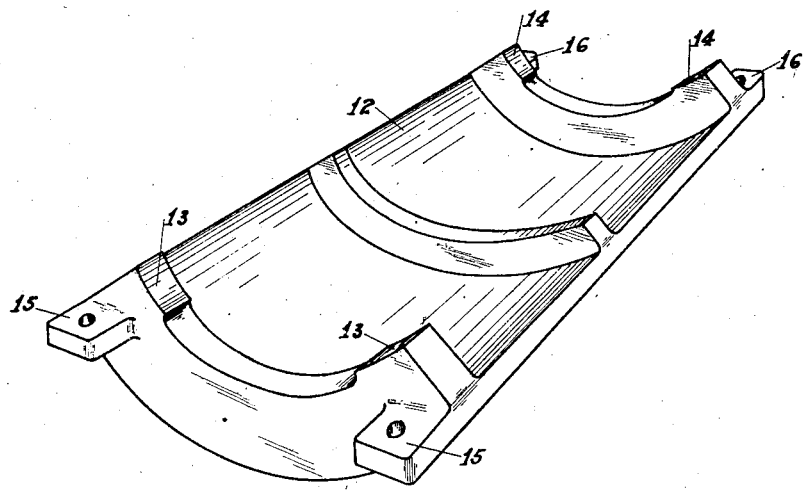

Oct. 18, 1927.

H. J. LOHBILLER 1,645,762

SUPPORT FOR HEAT CONVEYING PIPES

Filed May 12, 1922

INVENTOR
HARRY J. LOHBILLER.
BY
ATTORNEYS.

Patented Oct. 18, 1927.

1,645,762

UNITED STATES PATENT OFFICE.

HARRY J. LOHBILLER, OF ST. LOUIS, MISSOURI.

SUPPORT FOR HEAT-CONVEYING PIPES.

Application filed May 12, 1922. Serial No. 560,301.

My invention relates to the art of carrying and supporting steam, and analogous, pipes which are covered with asbestos, or other heat confining material, and has for its object to provide adequate and satisfactory means whereby the inevitable expansion and contraction of the pipe may be taken care of without sacrificing the completeness of the covering.

A further object is to provide such means whereby a heavy pipe main will be supported on rollers, the pipe being practically completely covered by its heat retaining covering, yet being also supplied with metal runners to engage the rollers.

My invention consists of certain details of construction hereinafter set forth, pointed out in my claim, and illustrated in the accompanying drawings, in which Figure I shows a transverse sectional view of a pipe main provided with its covering and my improved carrying device, the dotted lines indicating parts which would not otherwise show;

Fig. II shows a side elevation of the same, but only a piece of the pipe being shown, and also the covering being broken away at desirable places to show the arrangement; and Fig. III shows a detail view, in perspective, of the saddle I employ.

Referring to the accompanying drawings, the reference numeral 10 is used to indicate the pipe main which is covered with a heat retaining material, preferably asbestos, 11. This material is cut away to receive, or permit the seating of the saddle 12, the lugs 13—13 and 14—14, bearing directly against the pipe. The saddle 12 is provided with orificed ears 15—15 and 16—16 projecting on either end therefrom, the construction being such that the orifices in the respective pairs of ears are separated by a distance approximately equal to the outer diameter of the pipe and its attached covering material. A V-shaped metal strap, or rod, 17 fits over the pipe and its covering and has its screw-threaded ends extending through the respective orifices in the ears, and nuts 18 are then secured to the said ends and drawn up until the saddle is firmly seated against the pipe. As will be noted from the drawing, the saddle is curved on its under surface conforming, relatively, to the circumferential curve of the pipe and the lugs are so formed and placed as to rest, and to be firmly seated, against the periphery of the pipe, when it has been forced into position. The saddle itself by this construction, except for the lugs, is spaced from the outer periphery of the pipe, and the covering is designed to fit flush against the sides of the saddle. Flake or string asbestos, or equivalent material, is then inserted (through the openings 20, formed as shown) and the space between the saddle and pipe completely packed. Thus when the saddle is seated and space packed it is obvious that, with the exception of the points where the lugs engage the pipe, the pipe is completely surrounded with heat retaining material.

A roller 19 journaled in a bearing 20 is designed to provide a seat for the saddle. This roller, and its seat, may be suspended from the ceiling, or rest upon the floor or upon any auxiliary medium, as desired, its function being to receive the saddle and form a support on which the weight of the pipe, covering and saddle may be supported, the roller permitting the saddle to easily move longitudinally thereon, during the expansion and contraction of the pipe.

It has been the practice in the past to use the roller in direct engagement with the pipe, the covering being cut away for a distance sufficient to provide for the longitudinal movement of the pipe on the roller. As this distance is rather large it has been found that considerable heat escapes through this uncovered portion of the pipe.

Minor changes may be made in my construction without altering or changing my invention, the means shown being but the preferred form of construction, and I therefore do not desire to be limited in the scope of my invention, except as by the appended claim.

Having thus described my invention, what I claim and desire to secure by Letters Patent of the United States, is:

A support for heat conveying pipes surrounded with heat retaining material, comprising a saddle curved transversely to conform to the curvature of the pipe, transversely extending ribs formed upon the upper surface of the saddle, said ribs at their extremities provided with raised portions for contact with the surface of the pipe, said ribs providing a space between the pipe and the body of the saddle for the reception of heat retaining material, apertured lugs formed upon the corners of the saddle, straps extending over the pipe and engaging said lugs, and a channeled supporting roller conforming to the curvature of the saddle.

HARRY J. LOHBILLER.